United States Patent
Ryon et al.

[11] Patent Number: 5,909,106
[45] Date of Patent: Jun. 1, 1999

[54] CONTROL SIGNAL FOR A VOLTAGE GENERATOR FOR AN LCD SCREEN CONTROL CIRCUIT

[75] Inventors: David Ryon; Alain Boursier; Paul Norman, all of Le Mans; Richard Dauvillier, Allonnes, all of France

[73] Assignee: U.S. Philips Corporation, New York, N.Y.

[21] Appl. No.: 08/959,216

[22] Filed: Oct. 28, 1997

[30] Foreign Application Priority Data

Nov. 6, 1994 [FR] France .................................... 96 13534

[51] Int. Cl.⁶ ........................................................ G05F 1/10
[52] U.S. Cl. ............................................. 323/222; 323/283
[58] Field of Search ..................... 323/222, 282, 323/288, 907, 283

[56] References Cited

U.S. PATENT DOCUMENTS

| | | | |
|---|---|---|---|
| 5,272,614 | 12/1993 | Brunk et al. | 363/21 |
| 5,349,523 | 9/1994 | Inou et al. | 363/97 |
| 5,696,439 | 12/1997 | Presti et al. | 323/283 |

FOREIGN PATENT DOCUMENTS 4-58760  2/1992  Japan .

*Primary Examiner*—Shawn Riley

[57] ABSTRACT

For controlling a voltage generator (1), a control signal (PBM) is used, with an active part having a variable number of pulses (N) which determines the value of the output voltage of the generator. The output voltage of the generator is used to control the contrast of an LCD screen and the number of pulses in the control signal is adjusted in accordance with the temperature of the LCD screen to compensate for the effect that temperature has upon contrast.

3 Claims, 4 Drawing Sheets

CONTROL SIGNAL FOR A VOLTAGE GENERATOR FOR AN LCD SCREEN CONTROL CIRCUIT

BACKGROUND OF THE INVENTION

The invention relates to a voltage generator intended to be controlled by a control signal which comprises at least an active part and an inactive part.

The invention also relates to a signal intended to be used for controlling a voltage generator and comprising at least an active part and an inactive part, a circuit for controlling the contrast of a liquid crystal display screen by varying a power supply voltage applied to said screen, and an electronic device comprising a liquid crystal display screen and such a control circuit.

The invention is notably used in the field of telephony for telephone devices with liquid crystal display screens, for example screenphones, mobile phones, etc.

Such a voltage generator is described in U.S. Pat. No. 5,272,614 filed by the applicant on Jul. 2, 1992. This voltage generator particularly comprises a DC converter controlled by a microprocessor. The control signal supplied by this microprocessor to said converter is a pulse width-modulated signal. The output voltage of the converter thus varies with the cyclic ratio of said control signal.

Such a voltage generator behaves quite satisfactorily in the majority of cases. However, it may be insufficient when an output voltage is to be obtained which varies in a very precise way, as is, for example the case when controlling the contrast of a liquid crystal display screen.

OBJECTS AND SUMMARY OF THE INVENTION

It is an object of the invention to provide a voltage generator with which the output voltage can be varied in a very precise way.

To this end, a voltage generator according to the invention, intended to be controlled by a control signal which comprises at least an active part and an inactive part, is characterized in that said active part comprises a variable number of pulses which determines said voltage.

Similarly, a signal according to the invention, intended to be used for controlling a voltage generator and comprising at least an active part and an inactive part, is characterized in that said active part comprises a variable number of pulses which determines said voltage.

By rendering the control signal for the voltage generator more complex, the invention allows a very precise variation of the voltage supplied by this generator while using a very simple electronic assembly. The invention can thus be realized at a very low cost, which is primordial in the field of consumer applications, for example in telephone equipment.

A voltage generator according to the invention is particularly used to great advantage in a circuit for controlling the contrast of a liquid crystal display screen.

The contrast of liquid crystal display screens varies with the temperature: at a very low temperature, the crystal tends to be opaque, whereas it tends to be transparent at a very high temperature. The power supply voltage for the screen should thus be adjusted as a function of the temperature variations so that a contrast which is substantially constant is maintained.

It is therefore another object of the invention to provide a circuit for controlling the contrast of a liquid crystal display screen, using a voltage generator.

Advantageously, such a circuit comprises temperature-measuring means for supplying a first correction to be performed on said power supply voltage as a function of said temperature, means for controlling the contrast by the user for supplying a second correction to be performed on said power supply voltage as a function of said control, means for combining said first and second corrections, and means for applying, to said voltage generator, a control signal comprising a number of pulses as a function of said combination.

The power supply voltage of the screen is thus adjusted on the basis of a reference value to allow for modifications of adjustment performed by the user and for temperature variations.

These and other aspects of the invention are apparent from and will be elucidated with reference to the embodiments described hereinafter.

DETAILED DESCRIPTION OF THE PREFERRED EMBODIMENT

Figure 1:
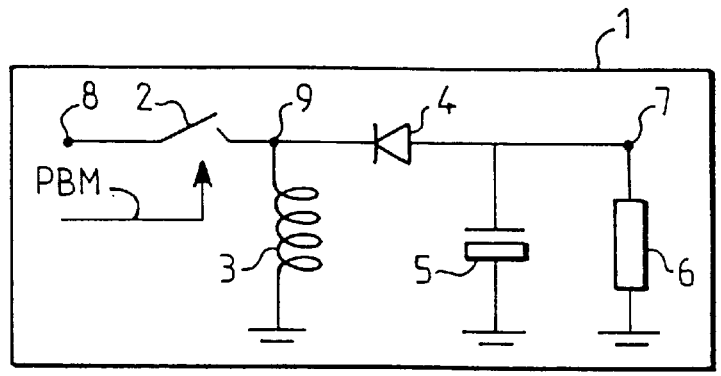
FIG. 1 shows a circuit diagram of a voltage generator according to the invention.

In FIG. 1, a voltage generator 1 according to the invention is shown by way of example in a diagram. It comprises a switch 2, a coil 3, a diode 4, a capacitor 5 and a resistor 6. The capacitor 5 and the resistor 6 are arranged in parallel between ground and the output 7 of the generator. The switch 2 is connected between a node 8 which constitutes a voltage reference and a node 9. This node 9 is connected to the output 7 of the generator via the inverse-connected diode 4, and to one of the terminals of the coil 3. The other terminal of the coil 3 is connected to ground. The switch is controlled by a control signal PBM.

When the switch 2 is open, the voltage at the terminals of the coil 3 charges the capacitor 5. When the switch 2 is closed, the capacitor 5 is discharged in the resistor 6. The voltage obtained at the output of the generator thus varies with the control signal PBM.

Figure 2:
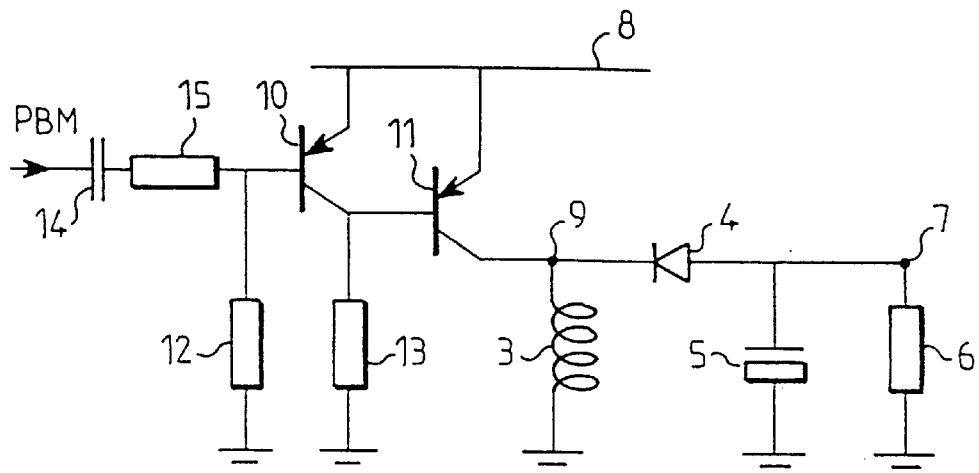
FIG. 2 shows an embodiment of a voltage generator according to the invention.

FIG. 2 shows an embodiment of such a generator. In this embodiment, the switch 2 is constituted by a first PNP transistor 11 with an emitter connected to the node 8 and the collector connected to the node 9. This transistor 11 is protected by a second PNP transistor 10 with an emitter connected to the node 8 and the collector connected to the base of the transistor 11. The bases of the transistors 10 and 11 are also connected to ground via a resistor 12 and a resistor 13. The control signal PBM is applied to the base of the first transistor 10 via a capacitor 14 and a resistor 15.

By way of example, the resistors 6, 12, 13 and 15 have values of $R_6=6.2$ kOhm, $R_{12}=100$ kOhm, $R_{13}=4.7$ kOhm and $R_{15}=10$ kOhm, respectively. The capacitors 5 and 14 have capacitances of $C_5=47$ μF and $C_{14}=470$ μF, respectively. The coil 3 has an inductance of $L_3=100$ μH. The diode 4 is a diode BAT54 and the transistors 10 and 11 are transistors BC858 and BC807, respectively. The reference voltage which is available at the node 8 is 5 V and the output voltage Vout of the voltage generator varies between 0 and −22 V in accordance with the applied control signal PBM.

Figure 3:
FIG. 3 shows a control signal in accordance with the prior art.

FIG. 3 shows a control signal PWM in accordance with the prior art. This signal is a pulse width-modulated signal. It is thus the variation of the cyclic ratio of this signal with which the searched output voltage Vout can be obtained: this control signal thus comprises an active part which is more or less long (of N elementary periods 1/F1) followed by a complementary inactive part.

Figure 4:
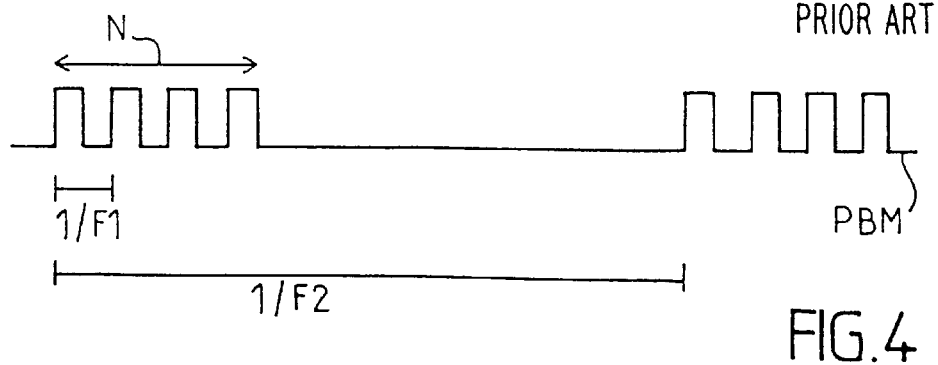
FIG. 4 shows a control signal in accordance with the invention, notably intended to control the voltage generator of FIG. 2.

FIG. 4 shows a control signal PBM in accordance with the invention. This signal comprises an active part having a variable number N of pulses at frequency F1 and a complementary inactive part. The number of pulses in the active part of the control signal according to the invention determines the output voltage Vout of the voltage generator. The modulation frequency of this control signal PBM is thus equal to $F2=1[Nmax.(1FN)]$ in which Nmax is the maximum number of pulses in the signal.

In the following description, the PBM signal used is constituted by N pulses having a cyclic ratio of 50% and a frequency F1=200 kHz, with N varying between 0 and 255, such that the modulation frequency of the control signal is equal to F2=785 Hz.

Figure 5:
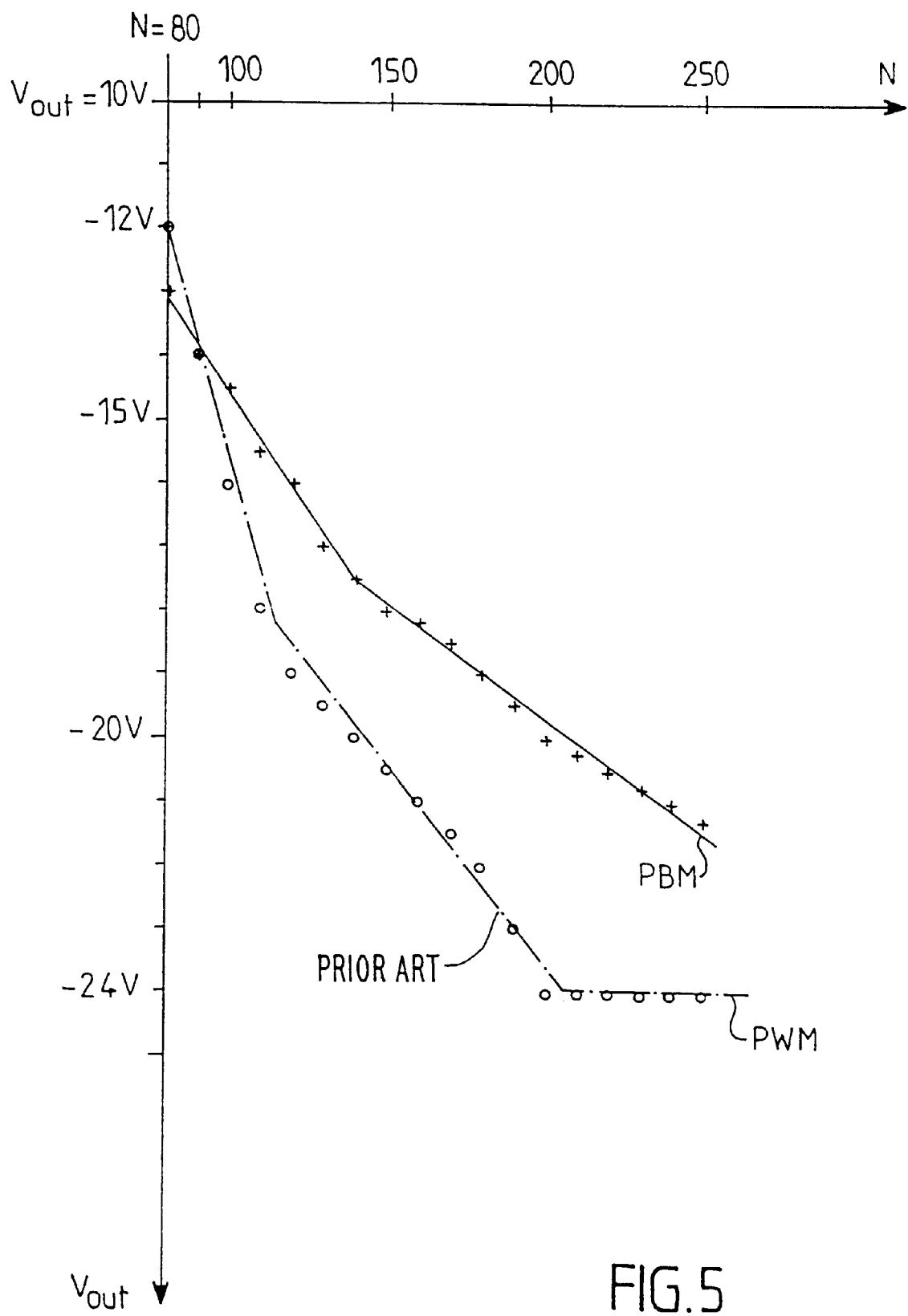
FIG. 5 is a graphic representation of the voltage obtained at the output of the voltage generator with the control signals in accordance with the invention and in accordance with the prior art.

Table I indicates the voltage Vout obtained at the output of the generator as a function of the number N for each control signal PBM and PWM. These results are shown in a graphic form in FIG. 5.

The Figure shows that with the control signal PWM in accordance with the prior art, the voltage Vout does not vary regularly as a function of N and saturates very rapidly. This control signal PWM notably does not allow a precise variation around the reference value of the power supply voltage for the liquid crystal display screen (dependent on the screen used, this reference voltage varies between −16 V and −21 V). In contrast, the control signal PBM according to the invention allows a very precise variation of the power supply voltage for a screen in the whole range between −16 V and −21 V.

TABLE I

| N | Vout (PBM) | Vout (PWM) |
|---|---|---|
| 80 | −13 V | −12 V |
| 90 | −14 V | −14 V |
| 100 | −14.5 V | −16 V |
| 110 | −15.5 V | −18 V |
| 120 | −16 V | −19 V |
| 130 | −17 V | −19.5 V |
| 140 | −17.5 V | −20 V |
| 150 | −18 V | −20.5 V |
| 160 | −18.2 V | −21 V |
| 170 | −18.5 V | −21.5 V |
| 180 | −19 V | −22 V |
| 190 | −19.5 V | −23 V |
| 200 | −20 V | −24 V |
| 210 | −20.2 V | −24 V |

TABLE I-continued

| N | Vout (PBM) | Vout (PWM) |
|---|---|---|
| 220 | −20.5 V | −24 V |
| 230 | −20.7 V | −24 V |
| 240 | −21 V | −24 V |
| 250 | −21.3 V | −24 V |

Figure 6:
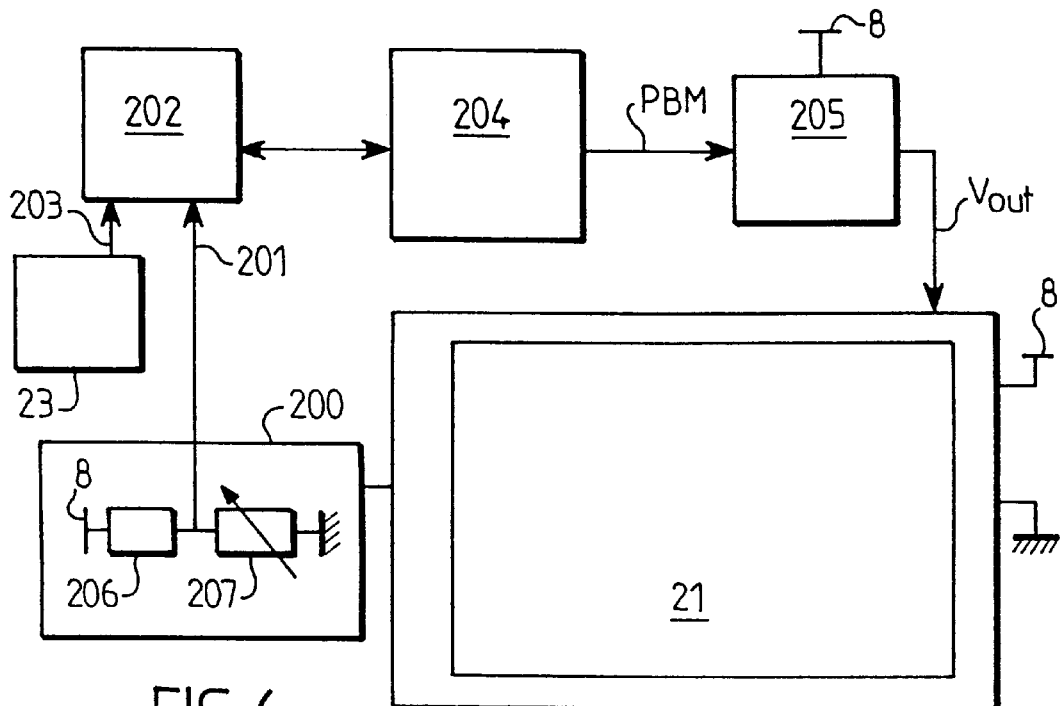
FIG. 6 shows a circuit for adjusting the contrast of a liquid crystal display screen according to the invention.

FIG. 6 shows a circuit for controlling the contrast of a liquid crystal display screen 21. This control circuit comprises a thermal sensor 200 connected to the screen 21 and to a first input 201 of a processor 202. The thermal sensor 200 supplies an analog voltage to the processor 202, which voltage is representative of the temperature at the level of the screen 21. The processor 202 has A/D-conversion means which, based on this analog voltage, supply a first numerical value T° which is representative of the temperature.

The processor 202 has a second input 203 at which it receives a second numerical value δN1 which indicates the contrast variation desired by the user of the device by means of a numerical control key 23 on the keyboard of the device.

The power supply voltage for the screen is thus automatically modified so as to maintain a constant contrast irrespective of temperature variations, and can be modified, if desired, by the user, when he wishes to modify the contrast.

To this end, the processor 202 comprises a correspondence table giving a number of pulses δN2 of the control signal PBM which corresponds to the numerical value T°. The processor 202 also comprises means for combining the two numerical values δN1 and δN2 (for example, adder means), for forming a global value δN.

Table II is an example of such a correspondence table.

TABLE II

| Temperature T° | δN2 | Temperature T° | δN2 |
|---|---|---|---|
| 0 | 0 | 26 | −1 |
| 1 | 0 | 27 | 0 |
| 2 | 0 | 28 | −1 |
| 3 | 0 | 29 | −1 |
| 4 | 0 | 30 | 0 |
| 5 | 0 | 31 | −1 |
| 6 | 0 | 32 | −1 |
| 7 | −1 | 33 | 0 |
| 8 | 0 | 34 | −1 |
| 9 | 0 | 35 | −1 |
| 10 | 0 | 36 | 0 |
| 11 | 0 | 37 | −1 |
| 12 | 0 | 38 | −1 |
| 13 | 0 | 39 | −1 |
| 14 | 0 | 40 | 0 |
| 15 | 0 | 41 | −1 |
| 16 | 0 | 42 | −1 |
| 17 | 0 | 43 | 0 |
| 18 | 0 | 44 | −1 |
| 19 | −1 | 45 | −1 |
| 20 | 0 | 46 | 0 |
| 21 | 0 | 47 | −1 |
| 22 | 0 | 48 | −1 |
| 23 | 0 | 49 | 0 |
| 24 | 0 | 50 | −1 |
| 25 | 0 | | |

The value of N supplied at the output of the processor 202 is applied to a programmable circuit 204. This circuit supplies the control signal PBM which is applied to a voltage generator 205 according to the invention. The output voltage Vout of this voltage generator constitutes the power supply voltage for the liquid crystal display screen 21.

The thermal sensor 200 is constituted, for example by a voltage divider bridge connected between ground and a reference voltage of 5 V, which comprises a resistor 206 of 10 kOhm and a resistor 207 having a negative temperature coefficient CTN and a value of 10 kOhm. This is the voltage which is taken from the terminal of this resistor 207 and applied to the first input of the processor 202.

The processor 202 is, for example a Hitachi H8 processor comprising an A/D converter. The programmable circuit 204 is for example an FPGA circuit (Field Programmable Gate Array) commercially available under the reference ACT1240XL by the firm of ACTEL.

Figure 7:
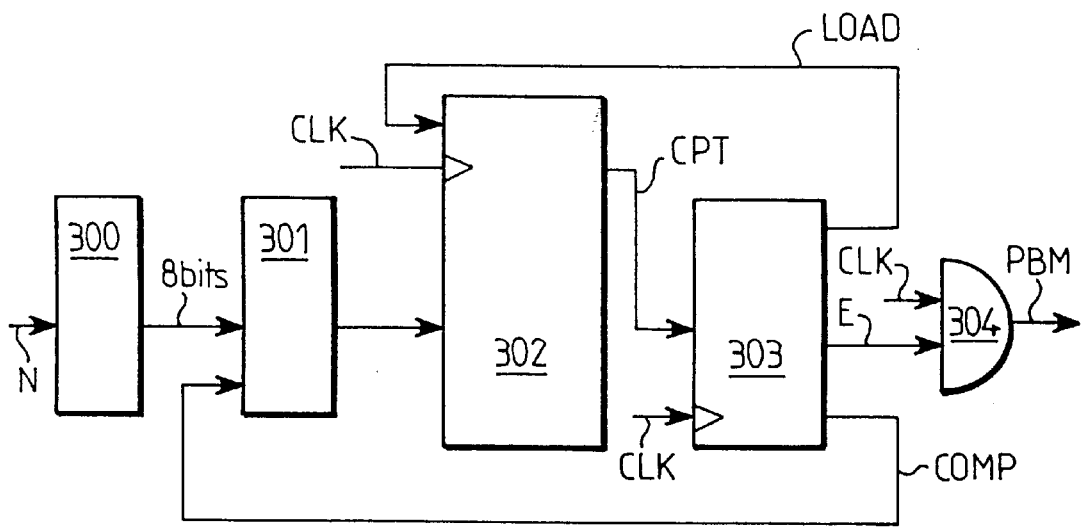
FIG. 7 is a diagrammatic representation of signals in a programmable circuit used in the control circuit of FIG. 6.
Figure 7:
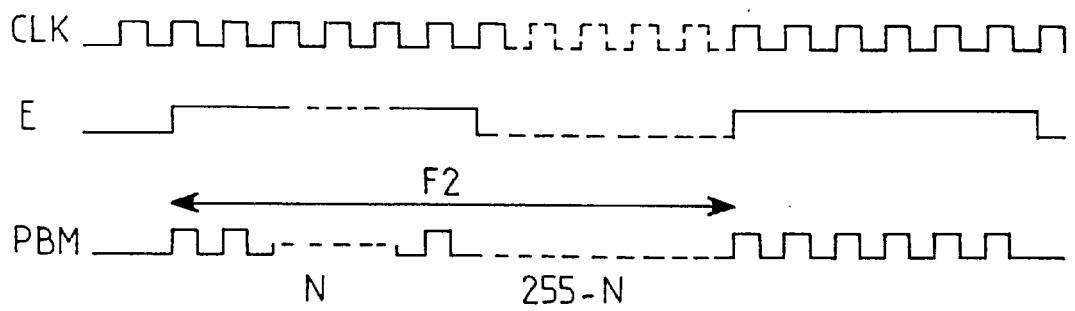

FIG. 7 is a diagram of this ACT1240XL circuit. It comprises:

a register 300 to be charged with the value of N, at 8 bits,
a block of 8 exclusive-OR gates 301 with a first input connected to the output of the register 300,
an 8-bit counter 302 with a first input connected to the output of the gate 301,
a logic control cell 303 having an input which receives an end-of-count signal CPT supplied by the counter 302 and supplies an envelope E of the control signal PBM at a first output, a complement signal COMP at a second output, and a signal LOAD for loading the counter at a third output. The complement signal COMP is supplied at a second input of the gate 301: the value loaded into the counter 302 is thus equal to N or to its complement at 255 in accordance with the state of the signal COMP. The signal LOAD for loading the counter is supplied at a second input of the counter 302. When it is active, it allows loading of the value supplied by the gate 301 in the counter 302,
a logic AND gate 304 receiving, at a first input, the signal E supplied by the cell 303 and, at a second input, a clock signal CLK having a frequency F1 which is equal to the pulse frequency of the control signal. The control signal is supplied from the output of this logic gate 304.

This circuit operates in the following manner: at the start, the value N which corresponds to the number of pulses to be obtained for the control signal PBM is loaded into the register 300. The counter 302 is first loaded with this value N (the signal COMP is in an inactive state). The counter 302 counts N pulses during which the control cell 303 supplies an envelope signal E in the active state. The output of the gate 304 is thus active and enables the clock signal CLK. When the counter 302 reaches the value N, the end-of-count signal CPT as well as the complement signal COMP supplied by the cell 303 changes to the active state. The envelope signal E changes to the inactive state. The value 255-N is thus loaded into the counter 302. The counter 302 thus counts 255-N pulses during the period when the envelope signal is in the inactive state. The output of the gate 304 is thus inactive, likewise as the control signal PBM. Thus, a signal of N pulses is obtained at a modulation frequency which is equal to F2=F1/255.

Figure 8:
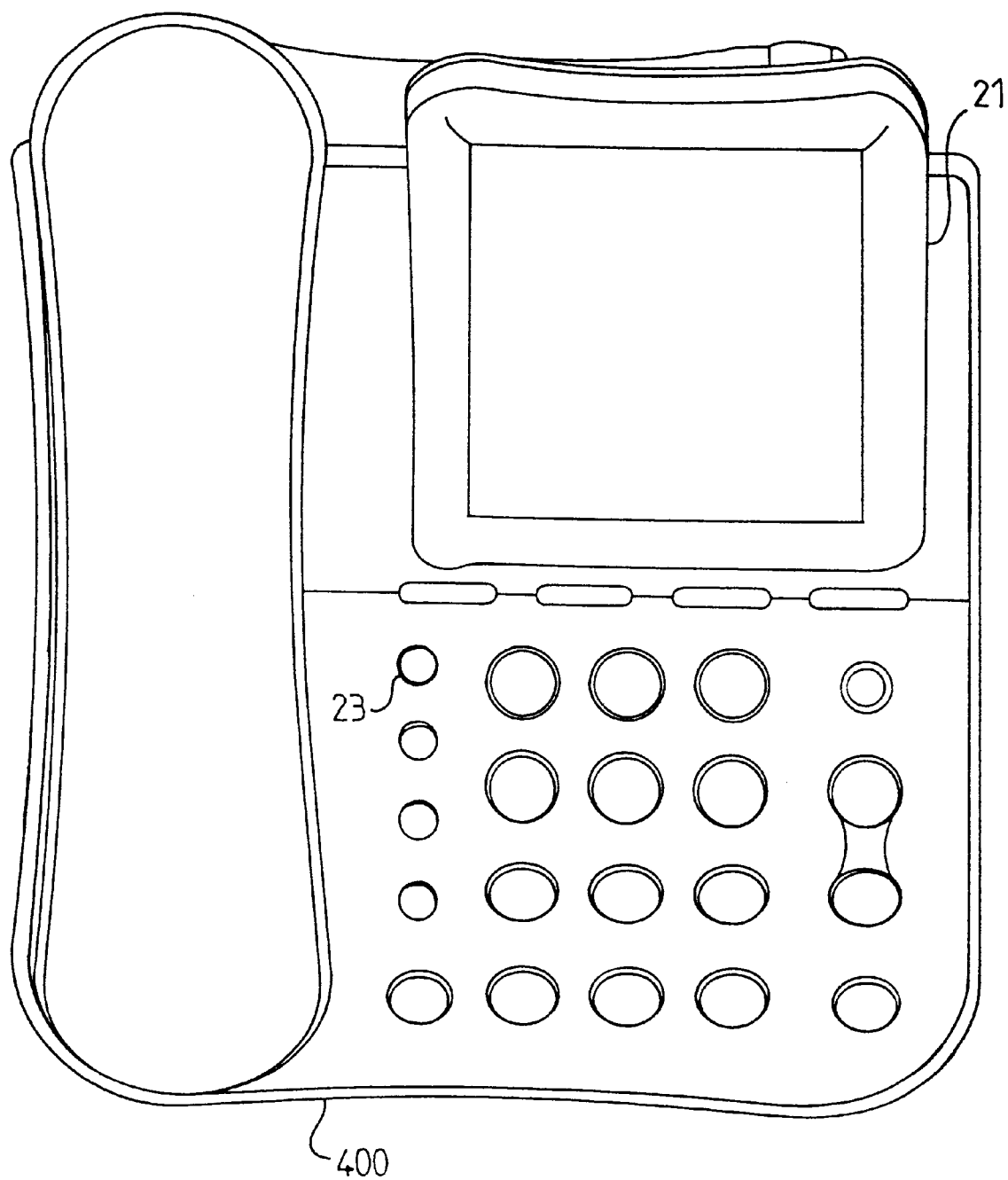
FIG. 8 shows an example of an electronic device according to the invention.

FIG. 8 shows an embodiment of an electronic device 400 according to the invention. This device is a screenphone which comprises a liquid crystal display screen 21 of the STN type, a keyboard 23 and a circuit 20 for controlling the contrast. The keyboard 23 also has a numerical key for controlling the contrast of the screen.

The numerical values given in the description were obtained with a liquid crystal display screen manufactured by the SHARP company. The principle of the invention is, however, adaptable to other types of screens, with possible modifications of the components used and the characteristics of the control signal (choice of the maximum value of the number N of pulses, the modulation frequency of the control signal, pulse frequency, etc.).

We claim:

1. A circuit for controlling the contrast of a liquid crystal display screen by varying a power supply voltage applied to said screen, the power supply voltage being controlled in accordance with a control signal produced by a control circuit, the power supply voltage having a value determined by the number of pulses in an active part of the control signal, the control circuit comprising:

temperature-measuring means for supplying a first correction to be performed on said power supply voltage as a function of said temperature, means for controlling the contrast by the user for supplying a second correction to be performed on said power supply voltage as a function of said contrast control, means for combining said first and second corrections to produce a combined correction, and means for supplying the control signal having an active part, the number of pulses in the active part being determined as a function of said combined correction.

2. A control circuit for controlling the contrast of a liquid crystal display screen characterized in that a power supply voltage applied to said screen is varied in accordance with an operator input of a desired contrast value and an automatically obtained measurement of the temperature of the liquid crystal display screen, said power supply voltage being determined by the number of pulses N in a control signal within a predetermined time period, the number of pulses N being determined as a combination of a first number of pulses N1 and a second number of pulses N2, the first number of pulses N1 being determined from the operator input of the desired contrast value and the second number of pulses N2 being determined from the obtained measurement of the temperature of the liquid crystal display screen through use of a correspondence table, the correspondence table storing a value of N2 for different temperatures of the liquid crystal display screen in order that a constant contrast is provided with respect to temperature variation of the liquid crystal display screen.

3. A control circuit as claimed in claim 2 wherein N is the sum of N1 and N2.

* * * * *